United States Patent [19]

Liu

[11] Patent Number: 5,157,094

[45] Date of Patent: Oct. 20, 1992

[54] AROMATIC VINYL ETHER SILOXANES

[75] Inventor: Kou-Chang Liu, Wayne, N.J.

[73] Assignee: ISP Investments Inc., Wilmington, Del.

[21] Appl. No.: 564,919

[22] Filed: Aug. 9, 1990

Related U.S. Application Data

[63] Continuation-in-part of Ser. No. 481,084, Feb. 16, 1990, Pat. No. 4,980,428, and a continuation-in-part of Ser. No. 424,453, Oct. 20, 1989, abandoned.

[51] Int. Cl.$^5$ .............................................. C08G 77/06
[52] U.S. Cl. ........................................ 528/14; 528/23; 528/27; 528/29; 549/215; 556/445
[58] Field of Search ..................... 549/215; 556/445; 528/27, 33, 29, 14

[56] References Cited

U.S. PATENT DOCUMENTS 4,990,546 2/1991 Eckberg .............................. 549/215

Primary Examiner—Melvyn I. Marquis
Assistant Examiner—Karen A. Hellender
Attorney, Agent, or Firm—Marilyn J. Maue; Joshua J. Ward

[57] ABSTRACT

This invention relates to an aromatic vinyl ether siloxane having the formula

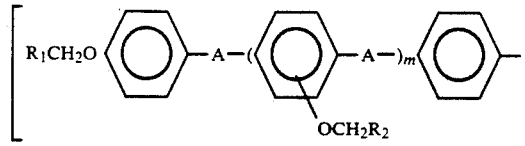

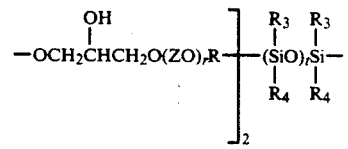

wherein
A is $-CH_2-$ or $>C(CH_3)_2$;
m has a value of from 1 to 22;
$R_1$ and $R_2$ are each selected from the group consisting of

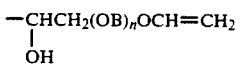

and

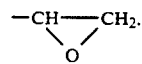

with the proviso that at least one of $R_1$ and $R_2$ is (a) and $R_2$ can be a mixture of (a) and (b) when m is greater than one,
$R_3$ and $R_4$ are lower alkyl,
r has a value of from 0 to 20,
R is alkylene or alkylene phenylene,
B is $C_2$ to $C_{20}$ alkylene, arylene or a fluorinated derivative of these radicals,
t has a value of from 1 to 100,
Z is $C_2$ to $C_3$ alkylene and
n has a value of from 1 to 10.

9 Claims, No Drawings

AROMATIC VINYL ETHER SILOXANES

This application is a continuation-in-part of copending U.S. Ser. No. 481,084, filed Feb. 16, 1990, entitled EPOXY VINYL ETHERS AND SYNTHESIS OF AN EPOXY VINYL ETHER FROM A HYDROXYLATED VINYL ETHER AND A POLYEPOXIDE, now U.S. Pat. No. 4,980,428 and of copending U.S. Ser. No. 424,453, filed Oct. 20, 1989, entitled EPOXY VINYL ETHERS, now abandoned.

In one aspect the invention relates to aromatic vinyl ether siloxanes having multifunctionality. In another aspect the invention relates to the use of the aromatic vinyl ether siloxanes as durable, chemically resistant soil release and anti-soil deposition coatings.

BACKGROUND OF THE INVENTION

Good soil release and anti-soil deposition coatings are in great demand; however, many of the commercially available products do not possess high resistance to chemical attack and do not present a hard surface coating. Also, some of the commercial coating products are limited to porous substrates and are not useful as coatings on metal, glass, etc. Further, it is highly desirable that coating materials on substrates subjected to impact and abrasion possess a hard, non-friable protective coating which many of the present coating materials have been found to be deficient. Accordingly, it is the aim of the present invention to provide novel compounds which are suitable as coating materials or coating additives which possess good adhesion to porous and non-porous surfaces and which are capable of forming a hard, chemically resistant protective layer on such substrates.

It is another object of the present invention to provide a compound having superior soil release and anti-soil deposition properties and which maximizes these properties in commercial formulations.

Still another object is to provide a commercially feasible and economical process for the preparation of the present compounds.

Still another object is to provide a process of using an aromatic vinyl ether siloxane as a coating or as an additive in a conventional coating composition to provide a coated product having high resistance to chemical attack.

Yet another object is to provide useful compositions incorporating an aromatic vinyl ether siloxane.

These and other objects of the invention will become apparent from the following description and disclosure.

THE INVENTION

In accordance with this invention there is provided a multifunctional polyphenyl vinyl ether siloxane having the formula

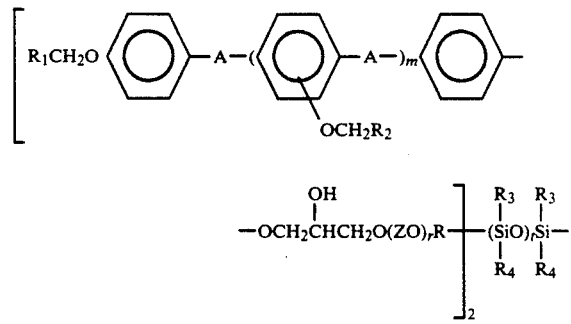

wherein
A is —CH$_2$— or >C(CH$_3$)$_2$;
m has a value of from 1 to 22;
R$_1$ and R$_2$ are each selected from the group consisting of

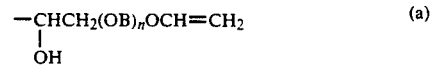

and

with the proviso that at least one of R$_1$ and R$_2$ is (a) and R$_2$ can be a mixture of (a) and (b) when m is greater than one,
R$_3$ and R$_4$ are lower alkyl,
r has a value of from 0 to 20,
R is alkylene or alkylene phenylene,
B is C$_2$ to C$_{20}$ alkylene, arylene or a fluorinated derivative of these radicals,
t has a value of from 1 to 100,
Z is C$_2$ to C$_3$ alkylene and
n has a value of from 1 to 10.

The preferred siloxanes of this invention are those wherein m has a value of from 1 to 10; t has a value of from 1 to 50; R$_3$ and R$_4$ are methyl and B is C$_2$ to C$_{10}$ alkylene.

Species of the present aromatic siloxanes include:

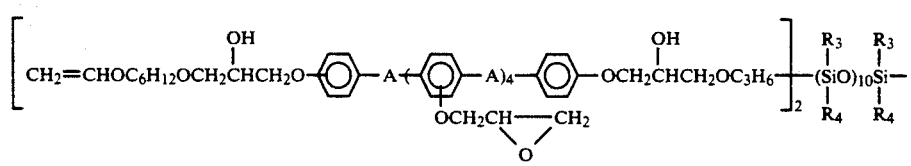

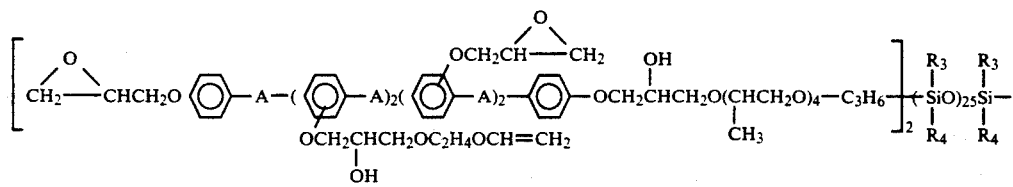

-continued

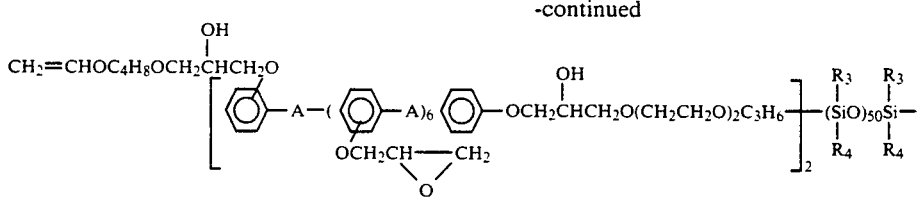

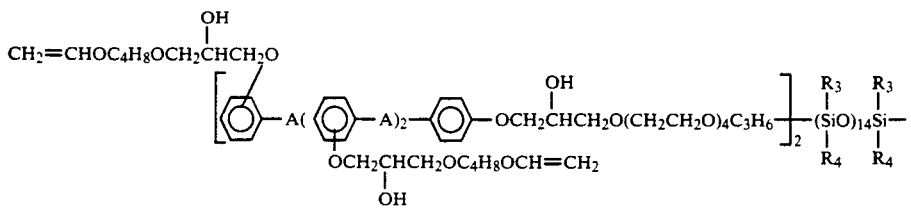

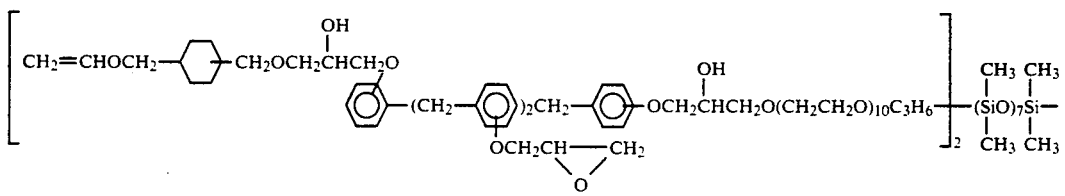

The present compounds can be synthesized by contacting a dialkyl siloxydiol reactant with a polybenzyl epoxylated ether coreactant, such as the product of copending U.S. Ser. No. 481,084 now U.S. Pat. No. 4,980,428 or the corresponding perepoxy derivative thereof. The equation illustrating the reaction can be expressed as

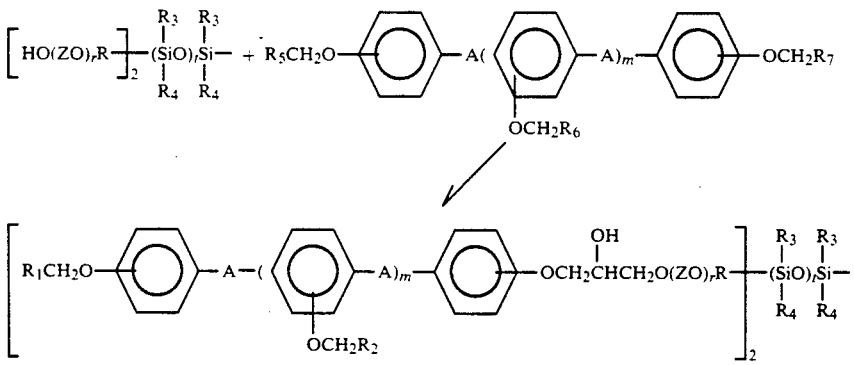

wherein Z, R, $R_3$, $R_4$, A, r, m and t are as described above and $R_5$, $R_6$ and $R_7$ are

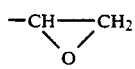

with the proviso that at least one of $R_5$, $R_6$ and $R_7$ is

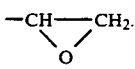

The above synthesis can be carried out under anhydrous conditions at a temperature of between about 100° C. and 180° C. under atmospheric pressure for a period of from about 1 to 200 hours; although preferred operating conditions include a temperature of between about 120° C. and about 160° C. and a reaction period of from about 4 to about 100 hours. The epoxy groups in the reaction mixture is at least equivalent to the total number of —OH moieties; that is to say a mole ratio of from about 1:1 to about 5:1, preferably between about 1:1 and about 1.5:1, excess being an epoxy group.

The reaction is effected in the presence of a basic catalyst such as alkali metal catalyst, such as sodium, potassium, or lithium metal particles, or hydrides or hydroxides of sodium, potassium or lithium. The catalyst comprises between about 0.05 and about 5 wt. %, preferably between about 0.1 and about 1 wt. % of the reaction mixture.

The reaction can be carried out in the presence or absence of an inert solvent; however, the use of a solvent for coreactant dilution up to 80% is recommended where the coreactant is highly viscous. Suitable inert solvents are those having a boiling point of at least 100° C. and include xylene, toluene, dimethyl ether, 2-methoxyethyl ether, tri- and tetra- ethylene glycol dimethyl ether, N-methyl pyrrolidone and the like.

The product of the reaction can be directly applied to a substrate such as a metal, glass, leather, plastic, ceramic, wood, fabric or fiber surface, in a thickness of from about 0.05 to about 5 mils to provide a durable, chemically resistant, stain resistant soil release and antisoil deposition coating thereon. Alternatively, between about 1% and about 10% by weight of the present compound can be incorporated into a commercial stain resistant coating formulation to improve adhesion properties and improved chemical resistance.

as to remove the water generated. 4-Hydroxybutyl vinyl ether (46.4 g., 0.4 moles) was then added and the mixture was held at 120° for a total 24 hours and then at 150° C. for 48 hours under a nitrogen blanket. A gel-like product containing

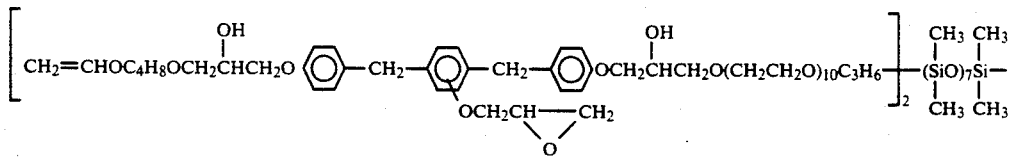

When desired, the product of the present process can be treated with absorbant magnesium silicate to remove small amounts of metal catalysts employed in the reaction. When such purification is desired, the ratio of magnesium silicate to catalyst is between about 50:1 and about 150:1. The treated product can then be filtered to separate the metal contaminants.

The present coatings are particularly useful when applied to the fibers of a carpet or when used as a coating over painted metal surfaces such as an automotive body. These coatings can also be buffed to a high luster which makes them particularly suitable as automotive and furniture coatings. Photographic films can also be coated with the present product or formulations incorporating the present product for improved protection against abrasion and chemical attack. The coating operation is carried out under standard methods using conventional equipment. Since the products of this invention are often highly viscous or waxy solids, they may be dissolved in a suitable inert solvent to provide the desired spreading consistency. Any of the above mentioned solvents as well as, N-vinyl pyrrolidone, vinyl ether, divinyl ether diluents such as divinyl ethers of 1,4-butanediol and 1,4-cyclohexanedimethanol, cyclohexyl vinyl ether, 2-ethyl hexyl vinyl ether, tri- or tetra-ethylene glycol, 1,6-hexanediol and lower boiling solvents such as acetone, methyl ethyl ether, cyclohexane and the like can be employed for this purpose.

Having thus described the invention, reference is now had to the following examples which illustrate preferred embodiments but which are not to be construed as limiting to the scope of the invention as more broadly set forth above and in the appended claims.

EXAMPLE 1

An ethylene oxide-propyl-dimethylsiloxane-propylethylene oxide block polymer (316 g.) from Alkaril Chemicals Ltd. (mol. wt. 1580, 20 units of ethylene oxide), epoxy resin Novolac DEN 438 (170 g., 0.3 moles) from Dow Chemical Corp. and potassium hydroxide (0.4 g.) were charged into a 1-liter flask equipped with a mechanical stirrer, a thermometer, a nitrogen inlet and a condenser equipped with a drying tube. The mixture was heated to 120° C. under a stream of nitrogen and held at that temperature for 2 hours so was obtained.

EXAMPLE 2

An ethylene oxide-propyl-dimethylsiloxane-propylethylene oxide block polymer (158 g.) from Alkaril Chemicals Ltd. (m. wt. 1,580, 20 units of ethylene oxide), epoxy resin Novolac DEN 439 (92.7 g., 0.15 moles) from Dow Chemical and potassium hydroxide (0.4 g.) were charged into a 500 ml flask equipped with a mechanical stirrer, a thermometer, a nitrogen inlet and a condenser equipped with a drying tube. The mixture was heated to 120° C. under a stream of nitrogen for 1 hour so as to remove the water generated. Monovinyl ether of cyclohexane dimethanol (34 g., 0.2 moles) (46.4 g.) was then added and the mixture was held at 120° for a total 24 hours and then at 150° C. for 48 hours under a nitrogen blanket. A gel-like product containing

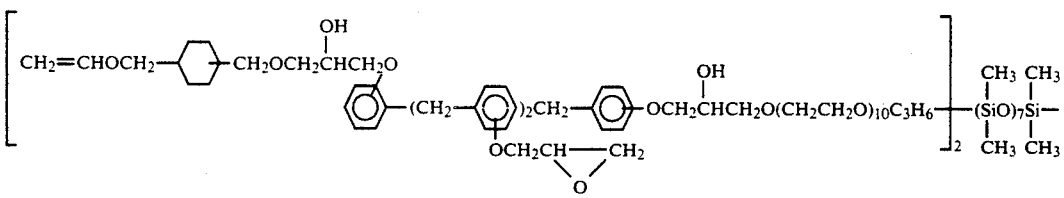

was obtained.

What is claimed is:

1. An aromatic vinyl ether siloxane compound having the formula

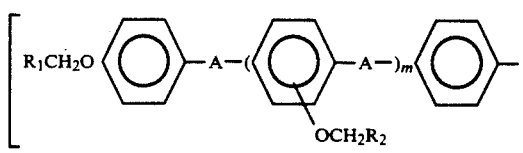

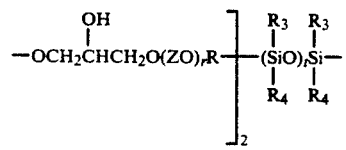

wherein

A is $-CH_2-$ or $>C(CH_3)_2$;

m has a value of from 1 to 22;

$R_1$ and $R_2$ are each selected from the group consisting of

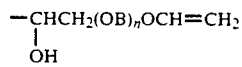 (a)

and

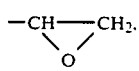 (b)

with the proviso that at least one of $R_1$ and $R_2$ is (a) and $R_2$ can be a mixture of (a) and (b), when m is greater than one,
$R_3$ and $R_4$ are lower alkyl, r has a value of from 0 to 20,
R is alkylene or alkylene phenylene, B is $C_2$ to $C_{20}$ alkylene, arylene or a fluorinated derivative of these radicals, t has a value of from 1 to 100,
Z is $C_2$ to $C_3$ alkylene and
n has a value of from 1 to 10.

2. The aromatic vinyl ether siloxane of claim 1 wherein $R_3$ and $R_4$ are methyl, R is $C_2$ to $C_6$ linear alkylene or $-CH_2C_6H_{10}CH_2-$, t has a value of from 1 to 50, m has a value of from 1 to 10 and r has a value of from 1 to 10.

3. The aromatic vinyl ether siloxane of claim 2 having the formula

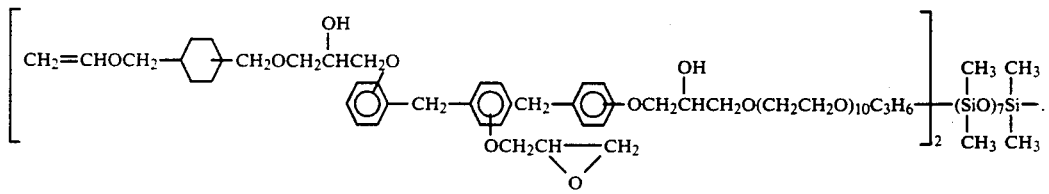

4. The aromatic vinyl ether siloxane of claim 2 having the formula

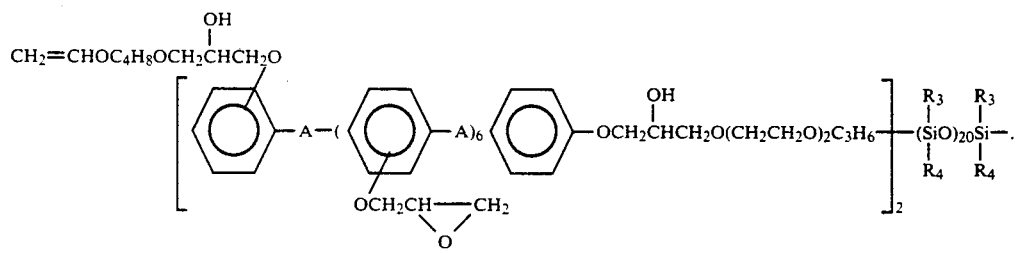

5. The aromatic vinyl ether siloxane of claim 2 having the formula

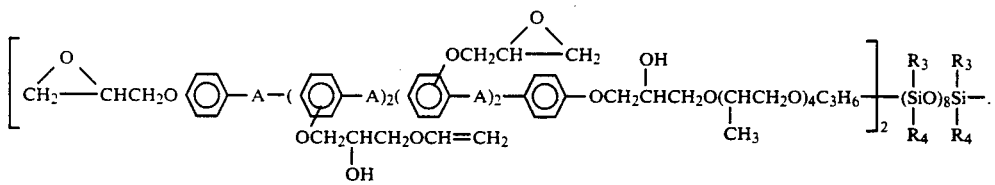

6. The aromatic vinyl ether siloxane of claim 2 having the formula

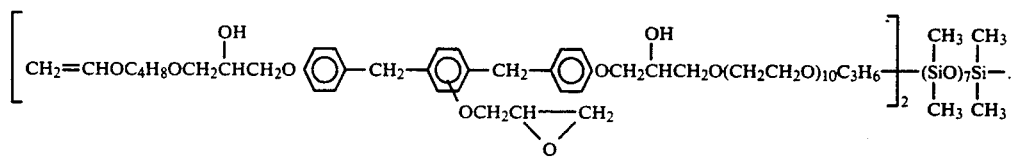

7. The aromatic vinyl ether siloxane of claim 2 having the formula

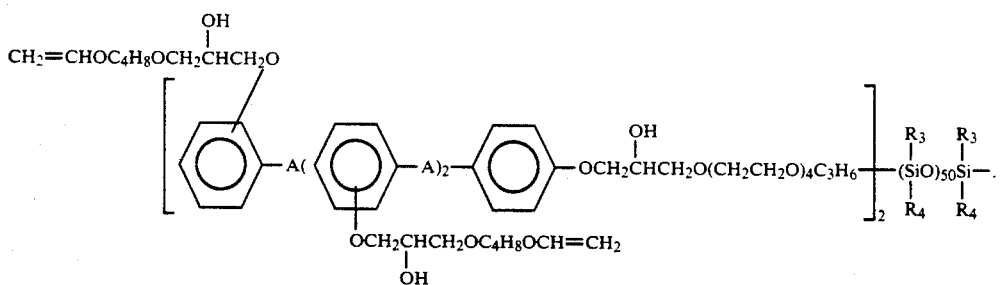
8. A coating composition for a substrate containing an inert carrier and an effective surface protecting amount of the aromatic vinyl ether siloxane of any one of the compounds of claims 1-7 inclusive.
9. The coating composition of claim 8 wherein said surface protecting amount is an antisoil deposition and soil releasing amount.
* * * * *